United States Patent [19]

Bailey

[11] Patent Number: 4,459,468

[45] Date of Patent: Jul. 10, 1984

[54] TEMPERATURE CONTROL FLUID CIRCULATING SYSTEM

[76] Inventor: David F. Bailey, 11500 NW. 26h St., Plantation, Fla. 33323

[21] Appl. No.: 368,287

[22] Filed: Apr. 14, 1982

[51] Int. Cl.³ .............................................. H05B 1/02
[52] U.S. Cl. ................................... 219/490; 219/212; 219/297; 219/309; 128/400
[58] Field of Search ............... 219/308, 309, 297, 494, 219/497, 505, 501, 212, 316, 528, 328, 332; 128/400

[56] References Cited

U.S. PATENT DOCUMENTS

| | | | |
|---|---|---|---|
| 3,894,213 | 7/1975 | Agarwala | 219/297 |
| 3,967,627 | 7/1976 | Brown | 128/400 |
| 4,167,663 | 9/1979 | Granzow, Jr. et al. | 219/309 |
| 4,182,567 | 1/1980 | Laar et al. | 219/496 |

*Primary Examiner*—M. H. Paschall
*Attorney, Agent, or Firm*—Arthur W. Fisher, III

[57] ABSTRACT

A fluid circulating system primarily designed for use with a thermal blanket or pad and being temperature controlled so that both heating and cooling effects may be produced through the preheating or precooling of fluid in a reservoir tank or like container which, wherein the fluid is in turn forced through the thermal blanket to provide the proper heating or cooling as desired. A standby switching mode is included to prevent circulation of the fluid through the thermal blanket by a pump structure until the fluid reaches a preselected temperature has been reached. Heating and cooling transfer elements are disposed to the fluid within the reservoir tank thereby eliminating the need for condensor structures and the like and allowing for a compact overall unit to provide the required fluid circulating throughout the thermal blanket.

11 Claims, 3 Drawing Figures

U.S. Patent      Jul. 10, 1984      4,459,468
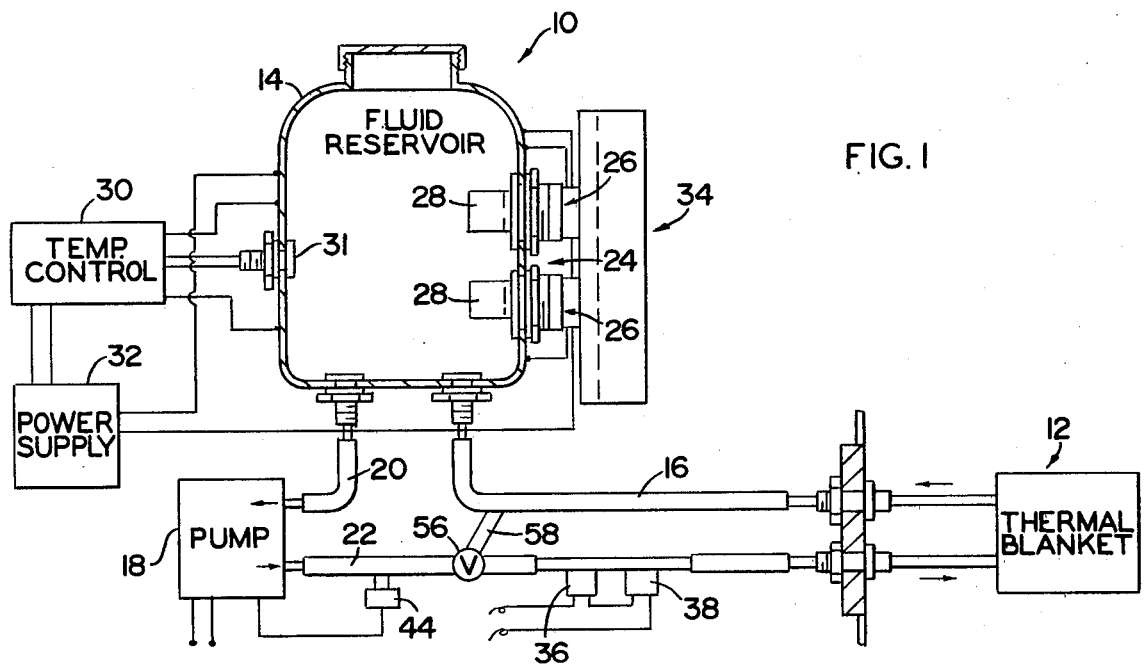
FIG. 1
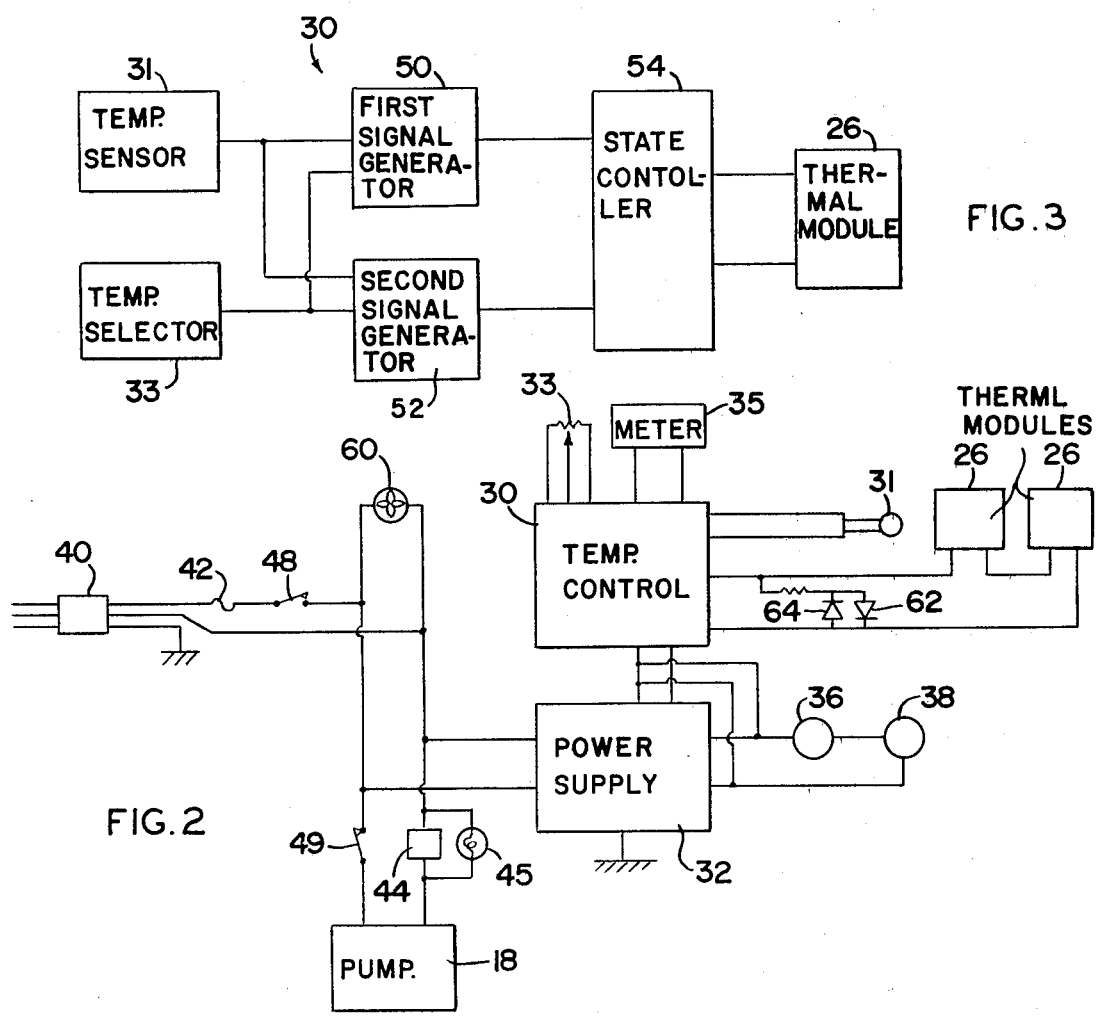
FIG. 3
FIG. 2

TEMPERATURE CONTROL FLUID CIRCULATING SYSTEM

BACKGROUND OF THE INVENTION

1. Field of the Invention

This invention is directed toward a fluid circulating system capable of selective temperature control primarily designed for use in combination with a thermal blanklet or pad wherein both heating and cooling effects may be produced.

2. Description of the Prior Art

Thermal blanklets and heating pads are of course well known in the prior art. Generally, thermal blanklets more commonly include either a cooling or heating effect wherein most heating blanklets or pads incorporate the use of electrical resistance elements disposed thereout the area of the blanket. Similarly cold applicator type pads or blanklets are commonly used in the medical field and frequently include a flexible plastic package containing two chemicals which when mixed together absorb heat. The chemicals are frequently packaged on either side of a rupturable membrane so that the application of the pressure to the exterior package ruptures the membrane and causes the fluids to mix and produces the heat absorbing reaction. Alternately, and more expensively, cooling pads are used through the application of a compressor, refrigerant condensing and evaporator coils. It is obvious that the above type cold pads or blanklets are heavy and cumbersome and therefore not as practical or variable as the structure of the present invention.

With reference to heat type thermal blanklets and again in the medical field, structures have been proposed in which a warmed or heated fluid circulate through a duct in the pad or blanket. Such structure is attempted to overcome the obvious inefficiencies and disadvantages concerned with the structures involving heating resistance wires embedded in the blanket or pad.

It is recognized that the use of fluid in a both a heating and cooling thermal blanket or pad is much desirable over the aforementioned prior art structures. However, such a structure does include certain disadvantages. The U.S. Pat. No. 3,894,213 to Kumar and Brown, U.S. Pat. No. 3,967,627 are examples of prior art structures which while operational appear to be bulky, less than reliable and do not have certain safeguards involved with the application of selected and variable temperature ranges which would be highly desirable.

SUMMARY OF THE INVENTION

This invention is directed towards a temperature control fluid circulating system of the type designed to be used in combination with a thermal blanket. More specifically, circulating system is capable of producing both a heated and cooled fluid of various temperatures which is circulated to the thermal blanket and continued being circulating to the extent that the thermal blanket itself, when applied may be maintained at the desired "hot" or "cold" temperature.

The structure of the system comprises a reservoir tank designed to hold fluid at a given capacity. A temperature transfer means including one or more thermal modules is connected to the tank and electrically interconnected to transfer plates to heat or cool the fluid within the reservoir tank. Both transfer plates, are disposed in direct exposure on the interior of the tank and thereby provide temperature changes of the fluid by such direct exposure or conduction. A temperature sensor is also disposed in direct exposure to the fluid in the tank and serves to direct the accurate temperature of the fluid back to a temperature control means. Such temperature control means in turn is electrically connected in current regulating and activating relation to the thermal modules whereby a continuous path of information flows between the temperature of the fluid being sensed to the temperature control means and back to the thermal modules for activation thereof in order to accomplish the desired temperature. A power supply means is interconnected to both the temperature control means and the temperature transfer means as well as a pump means.

The pump means serves as part of a closed circulating circuit or path of fluid flow extending from an inlet line through the pump means through the reservoir means and eventually back out the thermal blanket through an outlet line.

A switching means includes a plurality of switch elements including a conventional on/off manually operated switch whereby a source of electrical power is interrupted on its way to driving the power supply means. A second switch includes a standby switch and serves to deactivate the pump means from normal current flow until it is established that the proper temperature as desired in the thermal blanket and more specifically in the fluid itself has been established. Such establishment occurs through the temperature sensing means feeding back that temperature information to the temperature control means. The temperature control means includes circuitry to control the current flow to the thermal modules. The current direction through the thermal modules causes either heating or cooling of the fluid within the reservoir means. As set forth above, circulation of the fluid throughout the entire system may not occur until the fluid reaches the preselected temperature within the container.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a schematic view of the various components of the circulating system of the present invention.

FIG. 2 is a circuit diagram in schematic form of the various elements and electrical connections forming the power control circuit of the present invention.

FIG. 3 is a schematic view of the temperature control means.

Similar reference characters refer to similar parts throughout the several views of the drawings.

DETAILED DESCRIPTION OF THE PREFERRED EMBODIMENT

The present invention is directed toward a fluid circulating system being temperatured controlled and specifically designed for use in combination with a thermal pad or thermal blanket. In the body structure of the present invention, fluid maintained on the interior of a reservoir means generally indicated as 10 is passed through a plurality of inlet and outlet lines to reach the thermal blanket generally indicated as 12 and be circulated thereto as the prescribed temperature. More specifically, the reservoir means 10 includes a tank 14 having the desired capacity to hold a preselected amount of fluid complimentary to the sizes of the thermal blanket 12. Fluid is directed from the thermal blanket 12 into the interior of the reservoir tank 14 through proper connecting line 16 by pump 18 where it is heated or cooled as set forth above which will be explained in greater detail hereinafter. Fluid is fed from the reservoir tank 14 to the pump 18 by connecting line 20. An outlet connecting line 22 serves to interconnect the interior of the pump 10 with the thermal blanket 12. Fluid flow is directed through all of the aforementioned elements by means of the pressure exerted on the fluid by the pump means 18.

A temperature transfer means generally indicated as 24 includes one or more thermal modules each indicated as 26. The thermal modules 26 are structured to provide a heating and cooling effect on the fluid within the reservoir tank 14 through heat transfer elements 28 each thermally and physically coupled to the corresponding thermal modules 26 to provide proper heating and cooling of the fluid within the reservoir tank 14.

A temperature control means generally indicated as 30 is electrically interconnected to both the thermal modules 26 and more particularly is connected so as to provide a temperature sensing relationship to the fluid on the interior of tank 14 by means of a temperature sensor 31. In the preferred embodiment of the present invention the temperature sensor 31 comprises a thermistor structure whereby temperature can be accurately determined over a wide range. Proper feedback of the proper temperature and thereby electrical actuation or current direction through the thermal modules 26, is accomplished through the combination of current control to the thermal modules 26 as well as accurate sensing of the fluid therein. The temperature control means further includes an adjustable temperature selector 33 to selectively select the desired temperature over a wide range such as 40° F. to 105° F. A meter 35 provides a visual indication of the actual temperature within the tank 14.

In conjunction, a power supply means 32 is electrically interconnected to the temperature control means 30 and also provides power through the temperature control means 30 to the thermal modules 26. In operation, the temperature is sensed within the fluid as bringing preset to the desired specific temperature or range through operation of the temperature control means 30. The temperature control means 30 determines whether the temperature of the fluid within the tank 14 is accurate within a preselected range or needs to be raised or lowered. Accordingly, the proper current direction through the thermal modules 26 through an automatic hot-cold logic circuit is activated to heat or cool the fluid. Upon sensing of the proper temperature by the sensing element 31, it is related to the power supply 32 to maintain or cease activation of the thermal modules 26 to the point where the temperature may be maintained.

Other structures of the present invention includes a provision of a heat sink means generally indicated as 34 directly attached to the thermal modules 26 and structured to be exposed in direct surrounding environment so as to provide conduction of heating or cooling in a manner commonly known in the art.

With reference to both FIGS. 1 and 2 other structural features of the present invention include the provision of a first and second thermal breaker 36 and 38 disposed in proper fluid sensing position relative to temperature on the outlet line 22 are provided to interrupt the low voltage direct current power from the power supply 32 to the temperature control means 30 in an overtemp or undertemp condition from a preselected operating temperature range such as 40° F. to 105° F. As is well recognized in the art, a common power source generally indicated as 40 such as from a 120 volt AC source may be provided. A fuse element 42 is provided directly in line to provide overloading.

Additional sensing controls relative to proper flow include the pressure control means including a pessure control switch and pressure sensor 44. If the pressure within the outlet line 22 exceeds a predetermined desired point, the pressure controlled switch 44 is automatically opened and activation of pump 18 is ceased thereby stopping circulating of fluid flow throughout the entire system.

Lamp 45 provides a visual indication when the line 22 becomes clogged.

In addition to the above, a switching means is generally incorporated within the power control circuit generally defined above. The switching means includes a plurality of switch elements including a first switch element generally indicated as 48. First switch element 48 comprises a manually operated mechanically on/off switch to control current flow directly to the power supply 32, pump means 18 through second switch element 49 and temperature control means 30. The second switch element 49 serves as a standby switch and is directly interconnected to the on-off switch 48. After it is determined that the fluid has reached the predetermined temperature as required, the standby switch or second switch element 49 is closed thereby allowng current to flow to the pump means 18 causing its activation and circulation of fluid throughout the system. This insures a faster heat-up or cool-off period upon activation of the entire system than would normally be accomplished if circulation were maintained constantly through a thermal pad 12.

As best shown in FIG. 3 the temperature control means 30 including the temperature sensor 31 and the adjustable temperature selector 33 further includes automatic control logic circuitry to control the operation and function of the thermal modules 26. Specifically, the automatic control logic circuitry, a first and second signal generator indicated as 50 and 52 respectively in combination with a state controller 54. Both the first and second signal generators 50 and 52 are coupled to temperature sensor 31 and adjustable temperature selector 33 to receive signals simultaneously therefrom. The first signal generator 50 includes logic to selectively generate a heating or cooling signal when the sensed temperature exceeds or is less than a first predetermined temperature range respectively such as plus or minus five degrees F. within the selected temperature as determined by adjustable temperature selector 33. The second signal generator 52 includes logic to generate an active signal when the sensed temperature exceeds a second predetermined temperature range such as plus or minus 2° F. within the selected temperature as determined by the adjustable temperature selected 33 and an inactive signal when the sensed temperature is within the second predetermined temperature range. Signals from both the first and second signal generators 50 and 52 are fed directly to the state controller 54 which includes logic to generate a heating signal when the heating signal and active signal from the first and second signal generator 50 and 52 respectively are received, and inactive signal either when the heating or cooling signal from the first generator 50 is received and an inactive signal from a second signal generator 52 is received, and a cooling signal when cooling signal from first signal generator 50 and active signal from a second signal generator 52 is received. These signals are fed directly to the thermal modules 26 to control the heating, cooling, or inactivation thereof. Thus it is seen that where the selected temperature is greater or less than the actual sensed temperature the thermal modules are energized to either heat or cool the fluid within the reservoir 14. When the fluid within the reservoir 14 is within 2° F. of the selected temperature or the second predetermined temperature range the thermal modules 26 is deenergized until the temperature difference becomes greater than the second predetermined temperature range such as plus or minus 2° F. to reenergize the thermal modules 26.

In addition, to the previously described stand by mode a by-pass arrangement including a valve 54 or 56 and by-pass conduit 58 may be provided to circulate fluid between the reservoir 14 and pump 18 to preheat or precool the fluid to the selected temperature without passing through the thermal blanket 12 itself. This may be automatic or manual as desired.

A fan assembly 60 is provided to permit heating or cooling to the heat sink 34 using ambient air.

Lamps 62 and 64 provide a visual indication of the heating or cooling cycle.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language, might be said to fall therebetween.

Now that the invention has been described,
What is claimed is:

1. A temperature control fluid circulating system for automatically heating and cooling a thermal blanket, said system comprising a fluid containing tank connected in fluid communicating relation with the thermal blanket, a pump means connected to both said fluid reservoir means and the thermal blanket and structured to create fluid flow therebetween; a temperature transfer means including at least one thermal module coupled directly to said reservoir means in temperature transfer relation relative thereto to selectively heat or cool fluid within said reservoir means, a temperature control means electrically connected to said temperature transfer means in controlled relation thereto, said temperature control means including a temperature sensing means operatively coupled to said fluid reservoir means to continuously monitor the temperature of the fluid contained therein and generate an output signal corresponding to the fluid temperature therein, an adjustable temperature selector including logic means to generate a signal corresponding to the selected temperature and control logic coupled to said temperature sensing means and said adjustable temperature selector and said thermal module to selectively heat or cool fluid within said fluid reservoir means; said control logic includes a first signal generator coupled to said temperature sensor and said adjustable temperature selector to receive signals simultaneously therefrom, said first signal generator including a logic means to selectively generate a cooling signal when the temperature of the fluid within said fluid reservoir means exceeds the selected temperature by a predetermined temperature and a heating signal when the temperature of the fluid within said fluid reservoir means is less than the selected temperature by a predetermined temperature; a second signal generator coupled to said temperature sensor and adjustable temperature selector to receive signals simultaneously therefrom, said second signal generator including logic means to selectively generate a cooling signal when the temperature of the fluid within said reservoir means exceeds the selected temperature by a second predetermined temperature and a heating signal when the temperature of the fluid within said fluid reservoir means is less than the selected temperature by a second predetermined temperature, said signals from first and second signal generators being fed directly to a state controller, said state controller includes logic means to generate a heating signal when said heating signals from said first and second signal generators are received, and a cooling signal when said cooling signals from first and second signal generators are received, said heating and cooling signals from said state controller are selectively fed directly to said thermal module to control the heating or cooling thereof; a power supply means defining at least in part an electrical power control circuit and being disposed in current regulating interconnection to said pump means, said temperature transfer means and said temperature control means.

2. A system as in claim 1 wherein said temperature transfer means comprises a transfer element disposed in direct exposure to the fluid within said reservoir means and upon activation selectively causing heating or cooling thereof.

3. A system as in claim 2 further comprising heat sink means connected directly in heat conducting relation to said temperature transfer means and positioned in exposed relation to the surrounding environment.

4. A system as in claim 1 wherein said temperature transfer means is electrically interconnected to said power supply and in current regulating relation with said temperature control means, whereby said temperature control means may be preset to the desired temperature of the fluid within said reservoir means; said thermal module activated upon pre-selected current flow direction to said thermal module being activated.

5. A system as in claim 1 wherein said system comprises a closed system defined by a substantially one way path of travel of fluid flow including an inlet line, said pump forcing fluid flow between said inlet line and said reservoir means, and outlet line defining said path of fluid flow from said reservoir means to the thermal blanket, said pump means disposed within said path of fluid flow to force flow there along.

6. A system as in claim 5 further comprising pressure sensor means disposed in fluid exposed relation on said outlet line, said pressure sensor means coupled in current regulating relation to said pump means, whereby said pump means is electrically deactivated by fluid flow from said reservoir means to the thermal blanklet reaching a predetermined pressure.

7. A system as in claim 5 wherein said temperature control means further comprises a temperature sensor disposed in temperature sensing relation to fluid passing from said outlet line and being electrically interconnected in current regulating relation to said power supply to inactivate low voltage direct current from said power supply when a predetermined operating temperature range is exceeded.

8. A system as in claim 7 wherein said temperature sensor of said temperature control means comprises a first and a second thermal breaker both positioned in exposed relation to fluid passing from said reservoir means to the thermal blanket, and each selectively preset and electrically connected to cause on/off activation of said power supply when the fluid exceeds a predetermined operating temperature range.

9. A system as in claim 1 wherein said power control circuit further comprises a switching means including at least one switch disposed in current interrupting relation between a power source and the other critical elements of said power control circuit whereby said system may be deactivated.

10. A system as in claim 9 wherein said switch means comprises a second switch disposed in on/off current regulating relation between the power source and said pump to permit preheating of the fluid within said tank without fluid circulation.

11. A system as in claim 1 include a by-pass conduit coupled between said pump and said fluid reservoir means to selectively by-pass the thermal blanklet to permit preheating of the fluid within said fluid reservoir means.

* * * * *